United States Patent [19]

Soligny

[11] 4,452,038
[45] Jun. 5, 1984

[54] SYSTEM FOR ATTACHING TWO ROTATING PARTS MADE OF MATERIALS HAVING DIFFERENT EXPANSION COEFFICIENTS

[75] Inventor: Marcel R. Soligny, Chevilly-Larue, France

[73] Assignee: S.N.E.C.M.A., Paris, France

[21] Appl. No.: 443,163

[22] Filed: Nov. 19, 1982

[30] Foreign Application Priority Data

Nov. 19, 1981 [FR] France ................. 81 21649

[51] Int. Cl.³ ............................................. F02C 7/20
[52] U.S. Cl. .................................. 60/39.31; 60/39.32; 239/397.5; 403/85
[58] Field of Search ............... 60/39.31, 39.32, 39.5, 60/271; 415/207; 239/265.11, 397.5; 403/85, 119

[56] References Cited

U.S. PATENT DOCUMENTS

| 2,564,042 | 8/1951 | Walker | 60/39.32 |
| 2,620,157 | 12/1952 | Morley et al. | 60/39.32 |
| 2,799,472 | 7/1957 | Rainbow | 60/39.5 |
| 3,004,388 | 10/1961 | Foulon | 60/39.32 |
| 3,844,115 | 10/1974 | Freid | 60/39.32 |

FOREIGN PATENT DOCUMENTS

| 1217638 | 4/1960 | France . |
| 1313324 | 11/1962 | France . |
| 1458204 | 10/1966 | France . |
| 1545781 | 10/1968 | France . |
| 1551357 | 1/1969 | France . |
| 2408037 | 1/1979 | France . |
| 587512 | 4/1947 | United Kingdom . |
| 882186 | 11/1961 | United Kingdom . |
| 1503394 | 3/1978 | United Kingdom . |
| 2007773 | 5/1979 | United Kingdom . |

Primary Examiner—Louis J. Casaregola
Attorney, Agent, or Firm—Oblon, Fisher, Spivak, McClelland & Maier

[57] ABSTRACT

A system is disclosed for attaching a cap of composite material to the exhaust housing of a turbojet. The system consists of three triangular rod assemblies arranged between the housing and the cap. The triangular rod assemblies bear at their ends eyelets pivotally connected to brackets attached to the housing. The connecting rods are connected to the brackets by means of pivot pins, and to the cap by an attachment part and pivots. The attachment part is fixed to the cap by a bolt. The housing and the cap have cooperating bearing surfaces as well as a seal device.

11 Claims, 2 Drawing Figures

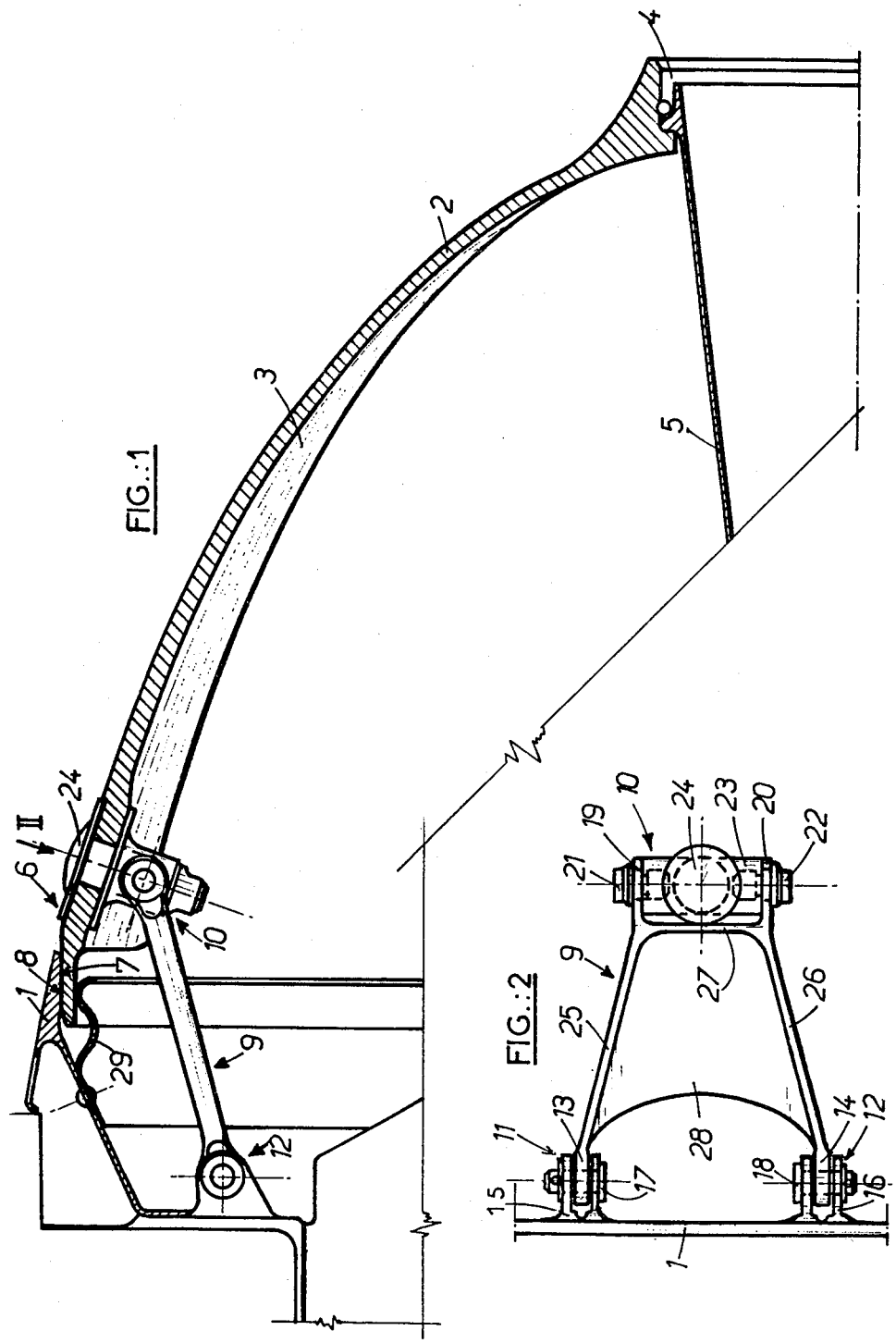

4,452,038

SYSTEM FOR ATTACHING TWO ROTATING PARTS MADE OF MATERIALS HAVING DIFFERENT EXPANSION COEFFICIENTS

BACKGROUND OF THE INVENTION

1. Field of the Invention

The invention concerns a system for attaching two rotating parts made of materials having different expansion coefficients, and more particularly to the attachment of an inner exhaust cap on the exhaust housing of a turbojet.

2. Description of the Prior Art

The current trend in the aeronautics industry is in the direction of reducing the weight of airframes and engines by using low-density composite materials. This reduction in weight leads to a reduction in fuel consumption and an increase in the load carried. Weapons-equipped aircraft make use of these materials, especially for airfoil and airframe elements. In contrast, their use in engines has not been very widespread because of the difficulties of using them in association with classic materials having relatively high expansion coefficients.

French Pat. No. 2,408,037, for example, describes the connection of a swivelling nozzle of woven carbon to an exhaust structure. The nozzle is girdled by rings of refractory cement. One of the rings is attached to the structure by flexible stops and the other is attached to the steering actuators by means of a metal box. The fact that the nozzle is connected by movable and flexible parts to the exhaust duct allows free axial as well as radial expansion of the latter without subjecting the woven carbon part to unacceptable stress.

Attempts have been made to replace other engine elements with composite material parts, in particular the inner exhaust cap or cone which is an extension of the exhaust housing. Tests have shown that it was not possible to connect the cap to the housing by known systems, as for example, the system disclosed in French Patent 1,458,204 for mounting a heat-protection sleeve in a post-combustion chamber. The screw-and-slipper system used does allow axial expansion but does not accept radial expansion very well. This system is usable only for metal materials having significant elongations.

SUMMARY OF THE INVENTION

The attachment system according to the present invention makes it possible to securely connect two rotating parts having different expansion coefficients so that each part can expand freely, both axially and radially, without their relative positions being modified.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 shows a partial section of an exhaust cap and an exhaust housing connected by an attachment system according to the invention; and FIG. 2 is a view along II in FIG. 1 of a part of the attachment system.

DETAILED DESCRIPTION OF THE PREFERRED EMBODIMENTS

FIG. 1 shows in half-section the exhaust housing 1 onto which is attached the inner exhaust cap 2. These two parts revolve around the axis of the jet engine.

According to the invention, the cap 2 is of a composite material, for example carbon/carbon or ceramic, and is connected to the housing which classically is made of a high temperature-resistant, noncorrodable metal. According to the embodiment shown, the cap has inner grooves 3 and has a coaxial opening 4 at its vertix into which empties the inner ventilation-air exhaust duct 5 of the shaft line.

The outer peripheral edge 6 of the cap has a cylindrical bearing surface 7 cooperating with a similar bearing surface 8 provided on the inner peripheral edge of the exhaust housing 1. These bearings constitute one element of the attachment system according to the invention and allow axial expansion of the housing independently of that of the cap.

The cap is connected by three rod assemblies 9, each having ends 10, 11 and 12. Each of the ends 10, 11 and 12 are articulated on axes on the cap and the housing held in place respectively by attachment elements 23, 15 and 16.

According to the preferred embodiment, the triangular rod assembly 9 is a molded part formed of two lateral girders 25 and 26 braced by a transverse girder 27 and an intermediate web 28. The triangular rod assembly 9 has a shape approaching that of an isosceles triangle. At the base of the triangle (that portion nearest the housing 1), the lateral girders 25 and 26 terminate in eyelets whose eye openings have axes transverse to the girders 25 and 26 and parallel to the plane of the rod assembly. The eyelets 13 and 14 are pivotally joined to brackets 15 and 16 of the housing 1 by pins 17 and 18.

The vertex of the triangular rod assembly 9 is truncated and is provided with eyelets 19 and 20 extending in planes parallel to those of eyelets 12 and 13. The eyelets 19 and 20 support pivots 21 and 22 of an attachment part 23 for permitting the rod assembly 9 to pivot about the attachment part 23. The attachment part 23 is fixed to the interior of the cap 2 by a bolt 24 passing through the cap. The head of the bolt and the attachment part 23 are separated from the wall of the cap by washers which distribute the compression stress. The edge of the web nearest the base 1 forms a concave shaped opening which allows for the easy removal of the pins 17 and 18 during disengagement of the rod assembly from the base 1.

There are preferably three rod assemblies 9 arranged at 120° circumferential intervals on the periphery of the housing and the cap. The rod assemblies allow radial thermal expansion of the housing while assuring good concentricity of the cap in relation to the housing. Of course, it would not be beyond the scope of the present invention to employ more than three rod assemblies, with the rod assemblies being regularly distributed around the periphery of the housing.

Following the differential expansions of the cap and the housing, tightness between the bearings 7 and 8 may not be very good. In order to prevent the combustion gases from bypassing the cap, seal 29 is provided consisting of a ring of elastic plates attached to the inside of the exhaust housing and resting against the inner edge of the exhaust cap.

The system according to the invention makes it possible, in the embodiment described, to attach an exhaust cap made of a carbon/carbon composite having an expansion coefficient on the order of $6 \times 10^{-6}$ to a metal exhaust housing with an expansion coefficient on the order of $16.5 \times 10^{-6}$, with the whole being subjected to temperatures of around 900° C.

The system described may be used for attaching to one another, any rotating parts having different heat expansion coefficients for which it is desired to avoid stresses due to expansion.

The position of the various elements constituting all or part of the attachment system may be modified and/or reversed without going beyond the scope of the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for attaching an inner exhaust cap formed of a composite material to a metal exhaust housing of a turbojet, said apparatus comprising:
   a first cylindrical bearing surface on a radially inner surface of said exhaust housing;
   a second cylindrical bearing surface on a radially outer surface of said cap and in cooperating surface contact with said first bearing surface;
   at least three rod assemblies circumferentially spaced from one another at positions radially within said cylindrical bearing surfaces;
   first attachment means fixed to said housing;
   second attachment means fixed to said cap; and
   pivot means for pivotally connecting respective ends of said rod assemblies to said first and second attachment means, whereby both radial and axial differential thermal expansions of said housing and said cap are compensated for.

2. The apparatus of claim 1, wherein said rod assemblies are in the shape of truncated isosceles triangles, the vertices of said triangles comprising said ends of said rod assemblies, said ends of each said rod assembly defining eyelets arranged perpendicular to the plane of said rod assembly and parallel to one another.

3. The apparatus of claim 1 wherein said first attachment means comprise brackets.

4. The apparatus of claim 2 wherein said first attachment means comprise brackets.

5. The apparatus of claim 1 wherein said second attachment means comprise a single attachment part receiving pivot pins of said pivot means.

6. The apparatus of claim 2 wherein said second attachment means comprise a single attachment part receiving pivot pins of said pivot means.

7. The apparatus of claim 2 wherein said rod assemblies further comprise:
   two lateral girders forming two walls of said triangle;
   a transverse girder at the truncated end of said triangle; and
   a web connecting said girders.

8. The apparatus of claim 1 including a seal fixed to one of said housing and cap and contacting the other of said housing and cap for sealing said bearing surfaces.

9. The apparatus of claim 2 including a seal fixed to one of said housing and cap and contacting the other of said housing and cap for sealing said bearing surfaces.

10. The apparatus of claim 8 wherein said seal comprises a ring of elastic plates.

11. The apparatus of claim 9 wherein said seal comprises a ring of elastic plates.

* * * * *